Patented Apr. 7, 1953

2,634,211

UNITED STATES PATENT OFFICE 2,634,211

PRODUCTION OF MEAT PRODUCTS

Stephan L. Komarik, Chicago, Ill., assignor to The Griffith Laboratories, Inc., Chicago, Ill., a corporation of Illinois No Drawing. Application May 4, 1951, Serial No. 224,667

12 Claims. (Cl. 99—108)

The present invention relates to the preparation of meat products. In particular it relates to the use of incompletely hydrolysed starch as a conditioner for all kinds of ground meat products.

Heretofore, prepared meat products such as encased meats, meat loaves, canned luncheon meats, and the like have been made from homogeneous mixtures comprising primarily ground meat, curing agents, flavoring materials, and water-binding agents, which latter commonly function additionally as emulsifiers for fat to give smoothness to the product. The water-binding agents function primarily to store water in the composition in a form not readily lost by evaporation. This is particularly important in encased meat products to minimize shrinkage which may result from drying. Because of the several functions exercised by the water-binding agents, they are generally referred to herein as conditioners. Conditioners are commonly selected from the cereals such as corn starch, wheat flour, soya meal, the gums, such as karaya, tragacanth and locust bean, and other classes, such as milk solids, agar agar, algin and alginate salts. These are all hydrophilic colloids and in general, they serve also as emulsifiers of fat to give smoothness to the product. However, as colloids they tend to gel as temperatures are lowered and concentrations increased, and to liquify as temperatures rise, with variation in their desired properties.

Most of the cooked meat products carrying colloid conditioners must be heated to at least 160° F. in cooking or smoking. This is true of loaf, some encased products and canned products. The heating denatures the colloids to a degree evidenced by decrease in water-binding power and by release of water during heating. This gives a soft watery product and when there is a following loss of the released water by evaporation there is shrinkage. Also, as such products age, the colloid conditioners in their gel form also age and in aging lose water-binding power which is manifested by shrinkage, accompanied by loss of water by evaporation or purging of water into the container.

The present invention is based upon the discovery that certain hydrolysates of starch have water-binding power as meat conditioners; that they are not sensitive to heat, and hence more stable; and that they are more stable over long periods of time with respect to water-binding function in meat products. Additionally, they give improved color to the meat and provide an antioxidant with respect to hemoglobin color.

Although the invention broadly contemplates any starch as a source of the hydrolysate, the invention is explained with particular reference to derivatives from corn starch, since these are by far the leading commercial materials. The corn refining industry has a well developed art of hydrolysing corn starch to convert the starch to dextrose. The hydrolysis is carried out by use of acid alone, or by use of acid for the initial stages followed by enzyme hydrolysis in the final states (see U. S. Patent No. 2,201,609). However, the conversion reaction may be arrested long before its completion to yield intermediate hydrolysates containing from small to large amounts of dextrose and other reducing sugars as well as from large to small amounts of intermediate products in the chemical path from starch to dextrose. Intermediate products are maltose, higher sugars, and dextrins, all of which eventually hydrolyse to dextrose. The character of the product as a hydrolysate is expressed by a "D. E." number which is the ratio of "dextrose equivalent," or in other words of reducing sugars, to the total dry substance of the hydrolysate (see Fetzer U. S. No. 2,210,659). Corn sugar is dextrose. Corn syrup of commerce is an incomplete hydrolysate, and contains dextrose, maltose, higher sugars and dextrins. Relative to colloidal starch, the ingredients of corn syrup are non-colloidal compounds of small molecular size. Commercial corn syrups are of such character that they may be dried to a powder, well known in commerce as "dry syrup." The powder is noticeably hygroscopic and substantially non-sweet. As the D. E. increases to 55 the fluidity of the liquid syrup and the hygroscopicity of the "dry-syrup" increase to the detriment of the water-binding power. Above D. E. of 55 the sweetness and a bitterness due to hydrol increase to a point making it objectionable in the quantities needed for use as a meat conditioner (see Brock et al. No. 2,410,264). When the D. E. is below 24, the hydrolysate reacts with iodine more like a cereal or starch giving a dark stain making it objectionable in certain fields as a meat conditioner; and, it functions more like a starch because of the greater molecular sizes of the ingredients. At D. E. of 24 there is commonly not over ½% starch in the solids, and frequently no starch content. At D. E. of 30 no starch is present. In the range from D. E. 24 to 30, starch may be present or not depending upon many factors in the conduct of the hydrolysis.

For the present invention the hydrolysates of starch herein contemplated for use as meat conditioners are those having a D. E. in the range from 24 to 55, and preferably from 30 to 42. These products are substantially non-sweet, are water-soluble as crystalloids rather than as colloids, and are subject to drying to powder form, however, with hygroscopicity of the powder increasing as the dextrose content increases. For convenience, the material is hereinafter referred to by the term "syrup-conditioner," whether it is in liquid form, or dried from such form to a powder. When used as an ingredient in a compounded meat product, the powder form takes on moisture to such extent that it again becomes syrup, which form it retains. The dry powder form is merely a convenient one for using the material as an ingredient in compounding meat products, or as an ingredient or carrier in a compounded mixture which mixture is an ingredient of a meat compound.

The general object of the present invention is to use syrup-conditioner as a water-binding agent in ground meat compositions.

It is also an object of the invention to prepare meat products of improved stability by the use of syrup conditioner.

It is a particular object to prepare ground meat products which are firm and stable, which are not subject to purging of fat when having an excess content of fat, which have improved and more stable color inside and outside, improved texture and smoothness on slicing, and less tendency to purge water and to dry and shrink.

Various other and ancillary objects and advantages of the invention will become apparent from the following description and explanation thereof.

The present invention is not directed to the use of dextrose, although it involves and takes advantage of certain known functions of dextrose. Merely because dextrose is one product of a starch hydrolysis, of which the other ingredients are of primary interest in the present invention, the upper limit in the range of D. E. for the hydrolysates is limited in part because of the dextrose.

In the U. S. Patent No. 2,147,261 Lewis describes the fixation, stabilization and restoration of desirable color in meat and in nitrite cured meat, by the use of reducing sugars, in particular dextrose. As reducing sugars Lewis describes "starch conversion syrups and sugars (such, for example, as dextrose), maltose, levulose, lactose and invert sugar." Relatively small amounts of reducing sugars are used by Lewis for the function of chemical reduction of compounds involving hemoglobin, and the treatments are directed primarily to expose surfaces of the meat where color changes, rather than to the mass properties of the meat and the water content.

In the meat-packing industry use of large amounts of dextrose is generally undesirable on account of excess of sweetness imparted to the meat product. The present invention uses much larger amounts of material limited in content of dextrose and other sweet ingredients, yet containing non-sweet reducing sugars as well as functioning ingredients which are not reducing sugars. By employing a hydrolysate of starch incompletely carried to its maximum dextrose content, there are provided water-soluble materials of greater-molecular size than dextrose including materials which are reducing sugars of substantially non-sweet character. In consequence the present invention provides all of the advantages as to hemoglobin color which are obtainable with small quantities of dextrose, and numerous additional advantages which are not possible with like amounts of dextrose. The material of the present invention is used for its physical functioning as well as its chemical functioning, thus to include all the advantages of the use of dextrose in small amount for its chemical function on hemoglobin color.

Starch conversions are commonly carried out with small amounts of mineral acid at least for initiating the hydrolysis. Where no enzyme is used the extent of the hydrolysis is regulated by the time of reaction at controlled temperature and pressure. Then the acid is neutralized. During the reaction the starch is initially a colloid, being hot-water-dispersible as distinguished from being water-soluble in either hot or cold water. The large molecules of the starch are broken down by the hydrolysis to a mixture of smaller molecules, progressively until dextrose is the final product. A stage is reached where some starchy colloid material is present with some dextrose, then a stage where there is little to no starch and an increased amount of dextrin and dextrose including a large quantity of water-soluble crystalloid materials intermediate between the dextrins and dextrose. Then the hydrolysis proceeds to break down all the intermediate materials to dextrose as the end product. The sweetness of the hydrolysate increases as the dextrose increases and the hydrolysate more or less passes over to a sweet product, and the sweetness and bitterness rapidly increase, after the D. E. passes 55.

The present invention employs a conversion hydrolysate in which sweetness is not pronounced and in which substantially all the material is suitably constant in its water-binding powers over the range of temperatures used in processing meat products. The material dissolves readily and being largely noncolloidal its solution is stable with changes in temperature. The range of D. E. from 24 to 30 is in general a transition zone with variations according to details of procedure in conducting the hydrolysis. Because stability is important for temperature changes from cooking to refrigeration, the lower limit for the hydrolysate is D. E. of 24, preferably 30.

From a D. E. of 24 upwardly to a D. E. of 55, the hydrolysate may be described as relatively non-sweet. At D. E. of 55 the product has a limited sweetness, which, however, can be masked by the presence of salt in amount commonly used in meat products. Using an hydrolysate having D. E. of 55 in the amount of 13 parts of hydrolysate solids to 100 parts of meat with the conventional quantities of salt, does not impart objectionable sweetness to the composition. However, where sweetness is desired more than 13 parts of hydrolysate having a D. E. of 55 per 100 parts of meat may be used. The non-sweet content of the hydrolysate is effective as water-binding content and especially as the fat emulsifying agent. The dextrose and other reducing sugar content are effective with respect to the color of the hemoglobin, and especially of the nitrosohemoglobin resulting from use of nitrite salt as a curing agent.

Because of the high water-binding power of the hydrolysate, there may be present in a meat product without disadvantageous softening, much more dextrose when it is a component of the hydrolysate, than when it is used as a single ingredient. For example, consider two bologna formulations having

| | |
|---|---|
| Beef | 50 lbs. |
| Fat trimmings | 50 lbs. |
| Sodium chloride | 2 lbs. |
| Curing salt (90% NaCl, 6% NaNO$_2$, 4% NaCO$_3$) | 0.25 lb. |
| Flavoring | as needed |
| Conditioner | A or B |

Where A is 0.5 lb. of corn sugar and B is 10 lbs. of starch hydrolysate of D. E. of 42, the B-formula has over eight times as much reducing sugar as the A-formula and over four times as much dextrose as the A-formula. The product of the B-formula is much redder and firmer than that of the A-formula. The dextrose alone in the A-formula tends to give softness to the product. But with over four times as much dextrose in the B-formula, the non-dextrose ingredients which accompany it exert a firming effect which overcomes the tendency to soften.

The following table gives the analysis of several acid-hydrolysates of corn starch in dry powder form as obtained in the open market as "dry syrup."

TABLE—COMPOSITION

[In percent by weight]

| | Specimen | | | | |
|---|---|---|---|---|---|
| | No. 1 | No. 2 | No. 3 | No. 4 | No. 5 |
| D. E. | 24 | 30 | 42 | 41–43 | 55 |
| Moisture Content | 3.4 to 4.5 | 3.5 | 3.4 to 4.5 | 3.0 | 3 to 5 |
| Protein | .05 | .06 | .05 | .04 | .05 |
| Ash | .20 | .24 | .22 | .26 | .24 |
| Acidity as HCl | .012 | .010 | .012 | .012 | .009 |
| SO$_2$ | .004 | .004 | .004 | .002 | .004 |
| Dextrose | 7.96 | 11.1 | 22.03 | 20.78 | 34.90 |
| Maltose | 8.78 | 12.6 | 20.73 | 20.21 | 26.91 |
| Higher Sugars | 20.54 | 20.3 | 20.04 | 19.7 | 17.95 |
| Dextrins | 62.43 | 52.8 | 36.89 | 36.0 | 19.94 |
| pH | 5.0 | 5.0 | 5.0 | 4.8 to 5.2 | 5.5 |

In the table, the product having D. E. of 24 is very high in dextrins, at least some of which are close to starch, and are colloidal. Products having a D. E. of approximately 42 are preferred, as a happy medium between the extremes, as indicated by the analyses. Various procedures for cooking canned hams and other meats are known, as for example those set forth in my U. S. Patents Nos. 2,224,399, 2,305,479 and 2,305,480. The internal temperature attained by the meat is at least 160° F. in these processes.

In general in treating meats temperatures in the range from 90° to 110° F. are avoided, as this is an incubation range for microorganisms. Lower than this, salami may be dried at 80° F. Higher than this, safety is assured by a minimum temperature of 120° F. The higher the temperature, the more the tendency to purge water and fat, and hence the greater is the protection against purging offered by the present invention.

The following examples illustrate various applications of the invention. In the formulas the total of lean and of fat is considered as "meat," and the term "curing salt" contemplates a compound of sodium chloride, sodium nitrite and sodium nitrate, and specifically one having such materials in a proportion by weight of 90 : 6 : 4, respectively.

EXAMPLE 1—SAUSAGE-BOLOGNA

*Ground and chopped meat*

| | |
|---|---|
| Beef | 25 lbs. |
| Snouts | 25 lbs. |
| Pork trimmings | 50 lbs. |
| Sodium chloride | 2 lbs. |
| Curing salt | 6 ounces |
| Dry soluble seasoning | 8 ounces |
| Ice | 15 lbs. |
| Dry syrup (D. E.=42) | 7 lbs. |

The foregoing mixture is compounded to smoothness, the ice and the meat providing water to dissolve the dry syrup. It is stuffed into casings in the conventional manner and smoked at 120° F. to 160° F. for two hours, then cooked for one hour in water or steam at 160° F. and chilled.

When the same formula is used with milk powder substituted for the dry syrup, the product exhibits purging of fat and jelly in smoking and cooking. The formula of Example 1 gives a firm sausage with good stable color inside and out and with smooth slicing quality to slices of desirable and stable color.

EXAMPLE 2—SAUSAGE

With 100 pounds of any meat, sodium chloride, curing salt, flavoring and spice, and ice, as in Example 1, use any quantity of dry-syrup (D. E.=24) from 1 to 13 lbs. The product may be processed as in Example 1, or in any other conventional way according to the type of sausage.

EXAMPLE 3—SAUSAGE

In Example 2 change the D. E. to 30.

EXAMPLE 4—SAUSAGE

In Example 2 change the D. E. to 42.

EXAMPLE 5—SAUSAGE

In Example 2 change the D. E. to 55.

EXAMPLE 6—LOAF

| | |
|---|---|
| Chopped beef | 50 lbs. |
| Ground pork trimmings | 50 lbs. |
| Sodium chloride | 3 lbs. |
| Seasoning | as needed |
| Curing salt | 6 ounces |
| Dry syrup (D. E.=30) | 1 to 13 |

The composition is mixed well in a mechanical mixer, then stuffed into a cellulose casing, pressed in a mold, and cooked in water or steam at 160° F. for 3½ hours for a 3½ inch diameter.

EXAMPLE 7

In Example 6 change the dry syrup to D. E.=42.

EXAMPLE 8

In Example 6 change the dry syrup to D. E.=55.

EXAMPLE 9—CANNED LUNCHEON MEAT

| | |
|---|---|
| Ground Picnic | 100 lbs. |
| Sodium chloride | 3 lbs. |
| Curing salt | 6 ounces |
| Flavoring | as needed |
| Dry syrup (D. E.=24) | 1 to 13 |

The composition is well mixed in a mechanical mixer, sealed in cans, and cooked at 160° F. for 3½ hours.

EXAMPLE 10

In Example 9 change the dry syrup to D. E.=30.

EXAMPLE 11

In Example 9 change the dry syrup to D. E.=42.

EXAMPLE 12

In Example 9 change the dry syrup to D. E.=55.

The more there is water in the formulation, as a component of the meat or in another ingredient of the composition, including a syrup form of the hydrolysate, the higher is the proportionate content of the hydrolysate solids. In dry formulations such as salami, very little need be added.

EXAMPLE 13—B. C. SALAMI

| | |
|---|---|
| Lean beef | 75 lbs. |
| Back fat | 25 lbs. |
| Sodium chloride | 3 lbs. |
| Curing salt | 6 oz. |
| Dry syrup (D. E.=42) | 1 lb. |

The meat content is ground through a $\frac{1}{8}$ inch plate, mixed with the remaining ingredients, allowed to cure for 24 hours at 38° to 40° F., then stuffed into natural casings. The product is then hung in a cooler at 42° to 45° F. until color shows through the casing, usually taking 1 to 2 days. Then the product is moved to a smoke house for a cold smoke at 80° F., until the desired color is obtained, usually in 24 to 48 hours. Thereafter the product is hung in a drying room at 56° F. for a period ranging from 35 to 60 days depending upon the diameter of the stuffed casing.

From the foregoing it will be appreciated that more than 13 pounds of the syrup conditioner per 100 pounds of meat may be used, but the resulting product becomes noticeably less meaty and more gummy. The preferred range from 3 to 13 pounds is set forth as suitable for maintaining the quality of meat products now satisfactory in the market and to the consumer.

Various modifications in departure from the foregoing illustrative examples are contemplated as falling within the scope of the appended claims.

I claim:

1. The method which comprises incorporating with ground meat a quantity of water-soluble hydrolysate of starch having a D. E. in the range from 24 to 55, said quantity ranging upwardly from 1 pound per 100 pounds of meat.

2. The method which comprises incorporating with ground meat a quantity of water-soluble hydrolysate of starch having a D. E. in the range from 24 to 55, said quantity ranging from 1 to 13 pounds per 100 pounds of meat.

3. The method which comprises incorporating with ground meat a quantity of finely divided solid water-soluble hydrolysate of starch having a D. E. in the range from 24 to 55, said quantity ranging from 1 to 13 pounds per 100 pounds of meat.

4. The method which comprises incorporating with a ground meat mixture a quantity of water-soluble hydrolysate of starch having a D. E. in the range from 24 to 55 as a conditioner, said quantity ranging from 1 to 13 pounds per 100 pounds of meat in said mixture, housing the resulting product in a container, and heating the housed product to a temperature of at least 120° F., said conditioner serving to minimize the purging of water and fat as a result of the heating.

5. The method which comprises incorporating with a ground meat mixture a quantity of water-soluble hydrolysate of starch having a D. E. in the range from 24 to 55 as a conditioner, said quantity ranging from 1 to 13 pounds per 100 pounds of meat in said mixture, housing the resulting product in a membranous meat casing, and heating the encased product in a gaseous environment to a temperature of at least 120° F., said conditioner serving to minimize the loss of water by evaporation through the casing and the purging of water and fat as a result of the heating.

6. The method which comprises incorporating with ground meat a quantity of water-soluble hydrolysate of starch having a D. E. in the range from 30 to 42, said quantity ranging upwardly from 1 pound per 100 pounds of meat.

7. The method which comprises incorporating with ground meat a quantity of water-soluble hydrolysate of starch having a D. E. in the range from 30 to 42, said quantity ranging from 1 to 13 pounds per 100 pounds of meat.

8. The method which comprises incorporating with ground meat a quantity of finely divided solid water-soluble hydrolysate of starch having a D. E. in the range from 30 to 42, said quantity ranging from 1 to 13 pounds per 100 pounds of meat.

9. The method which comprises incorporating with a ground meat mixture a quantity of water-soluble hydrolysate of starch having a D. E. in the range from 30 to 42 as a conditioner, said quantity ranging from 1 to 13 pounds per 100 pounds of meat in said mixture, housing the resulting product in a container, and heating the housed product to a temperature of at least 120° F., said conditioner serving to minimize the purging of water and fat as a result of the heating.

10. The method which comprises incorporating with a ground meat mixture a quantity of water-soluble hydrolysate of starch having a D. E. in the range from 30 to 42 as a conditioner, said quantity ranging from 1 to 13 pounds per 100 pounds of meat in said mixture, housing the resulting product in a membranous meat casing in a gaseous environment, and heating the encased product to a temperature of at least 120° F., said conditioner serving to minimize the loss of water by evaporation through the casing and the purging of water and fat as a result of the heating.

11. The method which comprises incorporating with ground meat water and a quantity of finely divided solid water-soluble hydrolysate of starch having a D. E. in the range from 24 to 55, said quantity ranging from 1 to 13 pounds per 100 pounds of meat.

12. The method which comprises incorporating with ground meat water and a quantity of finely divided solid water-soluble hydrolysate of starch having a D. E. in the range from 30 to 42, said quantity ranging from 1 to 13 pounds per 100 pounds of meat.

STEPHAN L. KOMARIK.

REFERENCES CITED

The following references are of record in the file of this patent:

UNITED STATES PATENTS

| Number | Name | Date |
|---|---|---|
| 2,147,261 | Lewis | Feb. 14, 1939 |
| 2,201,609 | Dale et al. | May 21, 1940 |
| 2,210,659 | Fetzer | Aug. 6, 1940 |
| 2,346,232 | Piret et al. | Apr. 11, 1944 |
| 2,355,548 | Musher | Aug. 8, 1944 |
| 2,410,264 | Brock et al. | Oct. 29, 1946 |